United States Patent
Kelley et al.

(10) Patent No.: US 7,669,057 B2
(45) Date of Patent: Feb. 23, 2010

(54) SECURE COMPUTER PASSWORD SYSTEM AND METHOD

(75) Inventors: Edward E. Kelley, Wappingers Falls, NY (US); Franco Motika, Hopewell Junction, NY (US); Tijs I. Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 10/905,854

(22) Filed: Jan. 24, 2005

(65) Prior Publication Data

US 2006/0168455 A1 Jul. 27, 2006

(51) Int. Cl.
*G06F 21/00* (2006.01)
(52) U.S. Cl. ..................................... 713/183
(58) Field of Classification Search .................. 713/183
See application file for complete search history.

(56) References Cited

U.S. PATENT DOCUMENTS

| | | | |
|---|---|---|---|
| 5,097,506 A | | 3/1992 | Kaiser, Jr. et al. |
| 5,182,770 A * | | 1/1993 | Medveczky et al. ............ 705/56 |
| 5,241,594 A * | | 8/1993 | Kung .......................... 713/151 |
| 6,064,736 A * | | 5/2000 | Davis et al. .................. 713/155 |
| 6,182,229 B1 * | | 1/2001 | Nielsen ........................... 726/8 |
| 6,230,269 B1 * | | 5/2001 | Spies et al. ................. 713/182 |
| 6,560,711 B1 | | 5/2003 | Given et al. |
| 6,581,162 B1 | | 6/2003 | Angelo et al. |
| 6,630,926 B2 | | 10/2003 | Challener et al. |
| 6,637,031 B1 * | | 10/2003 | Chou ........................... 725/87 |
| 6,710,269 B2 | | 3/2004 | Kunigkeit et al. |
| 2001/0005887 A1 * | | 6/2001 | Boroditsky et al. ......... 713/183 |
| 2002/0107907 A1 * | | 8/2002 | Case et al. ................... 709/203 |
| 2003/0051145 A1 * | | 3/2003 | Jackson et al. .............. 713/182 |
| 2003/0105900 A1 * | | 6/2003 | Kikinis ........................ 710/240 |
| 2003/0229795 A1 | | 12/2003 | Kunigkeit et al. |
| 2004/0030912 A1 | | 2/2004 | Merkle, Jr. et al. |
| 2004/0030914 A1 | | 2/2004 | Kelley et al. |
| 2004/0044896 A1 | | 3/2004 | Kelley et al. |

(Continued)

FOREIGN PATENT DOCUMENTS

EP 0750812 6/2003

(Continued)

OTHER PUBLICATIONS

Title: Algorithim To Inhibit Record/Play In A Non-Display Field IBM Technical Disclosure Bulletin Date: Apr. 1990.

(Continued)

*Primary Examiner*—Kambiz Zand
*Assistant Examiner*—Teshome Hailu
(74) *Attorney, Agent, or Firm*—Jay Anderson; Daryl Neff; Ronald Kaschak

(57) ABSTRACT

An enhanced security method is provided for accessing information from a second computer using a password at a first computer. According to such method, a password used for accessing information is inputted to the first computer and stored on the first computer. Thereafter, the stored password is encoded using an encoding algorithm which is system specific to the first computer, and the encoded password is then transmitted to the second computer. The encoded password is used at the second computer to grant or deny access to the requested information, without the second computer having to decode the encoded password to obtain the password stored on the first computer.

18 Claims, 3 Drawing Sheets

U.S. PATENT DOCUMENTS

| | | | |
|---|---|---|---|
| 2004/0054929 A1 | 3/2004 | Serpa | |
| 2004/0054935 A1* | 3/2004 | Holvey et al. | 713/202 |
| 2004/0123153 A1* | 6/2004 | Wright et al. | 713/201 |
| 2005/0050322 A1* | 3/2005 | Mizrah | 713/168 |

FOREIGN PATENT DOCUMENTS

| | | |
|---|---|---|
| WO | WO02/100016 | 12/2002 |
| WO | WO03/062968 | 7/2003 |

OTHER PUBLICATIONS

First Office Action in Chinese Application No. 100014692. (State Intellectual Property Office of China) Nov. 29, 2007.

Zhang Conge, Cao Shoujian, and Li Lixin. "A Password Authentication Scheme Based on Smart Card," Computer Engineering, vol. 30, No. 7, pp. 104-105, 163, (Apr. 2004) (with English abstract).

* cited by examiner

SECURE COMPUTER PASSWORD SYSTEM AND METHOD

BACKGROUND OF THE INVENTION

The present invention relates to a computer-based security system.

Keyboard input tracking programs exist today which are capable or recording and reproducing everything that is input to a computer system via a keyboard. Initially, such programs were developed as a way of protecting data integrity and as tools for solving a variety of problems. For example, when the operation of a computer system is suddenly interrupted as a result of a glitch or a power interruption, the inputted keystrokes logged by a keyboard tracking program have been used to restored unsaved data. Another way such programs have been used is to effect repairs to a computer system through remote access, e.g., through observing the operation and input provided via a keyboard to a computer in real-time.

Unfortunately however, these programs have been utilized by hackers to gain unauthorized access to secure information. The misuse of such information has been detrimental to both businesses and individuals. Spyware is a term broadly describing programs that tend to install themselves automatically on a user computer system via online advertisements and e-mail messages. Spyware includes programs which capture a user's personal information, generate unwanted pop-up advertisements, redirect web page requests, and generally make computers sluggish. Keystroke logging, or keylogging, is a very dangerous form of spyware. Keystrokes, including credit card numbers and passwords used for online banking, can be recorded surreptitiously and used to gain unauthorized access to personal user data. It is unknown how many people have been victims of keystroke logging, but many security experts agree that it has become a big part of a growing problem of online fraud. Such fraud hinders the further growth of the Internet for providing personal and financial services to individuals and businesses.

Many businesses including financial institutions have websites that require a password and encrypted transmission to protect individual account information from becoming known. Unfortunately, the use of a password and encryption alone do not address keystroke logging. Keystroke logging continues to be a threat to such systems because it copies information while being input to a keyboard before it is encrypted for transmission. Thus, a password entered on a keyboard is subject to capture by the remote keystroke logging program, transmitted to an unauthorized person, and used by that person, despite the protections afforded by the encrypted transmission between user computer and the website.

Consequently, a system and method are needed to protect systems from the threat of illicit copying of passwords and other sensitive information, such as through keystroke logging programs.

SUMMARY OF THE INVENTION

According to an aspect of the invention, an enhanced security method is provided for accessing information from a second computer using a password at a first computer. According to such method, a password used for accessing information is inputted to the first computer and stored on the first computer. The stored password is then encoded using an encoding algorithm that is system specific to the first computer, and the encoded password is then transmitted to the second computer. The encoded password is used at the second computer to grant or deny access to the requested information, without the second computer having to decode the encoded password to obtain the password stored on the first computer.

DETAILED DESCRIPTION

The embodiments of the invention described herein provide a secure system and method for the transmission of information such as a password or other information used to obtain access to secure information. In a specific embodiment provided herein, a password is protected against capture, for example, by a clandestine keyboard copying program such as a keystroke logging program or other snooping program. In such embodiment, the password is protected from capture by encoding, e.g., encrypting, the password after the password has been entered on a keyboard. In a particular embodiment, the password is encoded using data which is unique to the computer system to which the password is inputted by a user. The encoded password can then be transmitted to another computer system for use, for example, as an access control password between the two computer systems. In another example, the encoded password is stored on the computing system to which it is originally inputted, the encoded password being used to access information stored on that computing system.

While the embodiments of the invention are described herein in detail in terms of providing protection for a password, the principles of the invention can be applied to protect information other than passwords per se, such as password prompting information, which is used in case a password is lost or forgotten. Moreover, the embodiments of the invention described herein are simpler to implement and to use than private key encryption systems, since there is no need to exchange private key(s) between computer systems. The password is encoded only at the computer system to which the password is inputted and any other computer system receives and uses only the encoded password, without having to decode or decrypt the encoded password. The receiving computer treats the encoded password as the actual password, since the receiving computer system never receives the password in the form originally input by a user.

Figure 1:
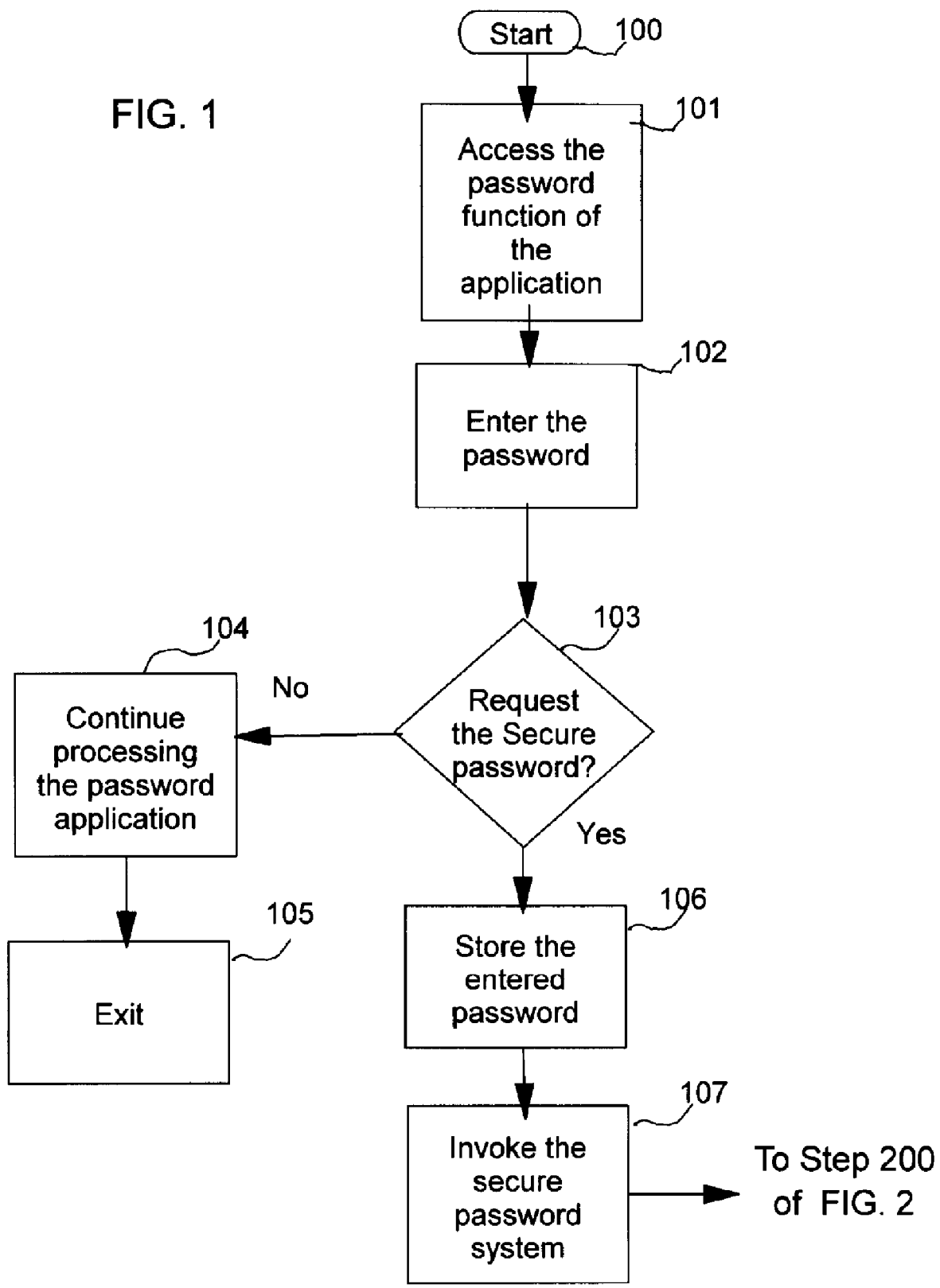
FIGS. 1 and 2 together provide a flowchart illustrating an enhanced security method for accessing information from a second computer using a password in accordance with an embodiment of the invention.

Referring to FIG. 1, a flowchart of operation is illustrated, in which step 100 represents a starting point. At step 101, a password function is accessed for an application. This can be for any application that requires a password. Applications which require access to private user information typically require a password. In this way, access is restricted to an authorized user. Frequently, such applications operate by exchange of information over a network, through a combination of programs which execute on a user system or "client" system, and a host system or "server" system. For example, the application can provide access over a local area network or wide area network, examples of which include but are not limited to an office or enterprise network, an intranet or a public network such as the Internet, e.g., through the World Wide Web (hereinafter, "the web") over hypertext transmission protocol (HTTP) or other networking protocol. Particular examples of such applications are those which involve personal information to be kept secure such as financial information, e.g., as related to investments, banking, sales of goods and services, accounting, social security, pension/retirement benefit programs, insurance, credit records, charitable contributions, etc.; medical information, such as relating to treatment, diagnosis, prognosis, prescriptions, etc.; educational records, private licensing records, such as for driver and professional licenses; employment history information, information for members of clubs and associations, and subscriptions. All of the foregoing applications are merely by way of illustration, as any information requiring a password to gain access benefits from applying the principles of the present invention. In a particular embodiment, the password function of the application may be accessed by visiting a log-in page of a website that prompts the user for entry of a password. Otherwise, this step 101 is performed when any type of application prompts the user to input a password. For example, a log-in page of a website may contain a field requiring a user to input a password to gain access to account information of the user. In response, at step 102, the user enters a password. In an appropriate case, when the user has already established access to the application on a previous occasion and has authorized the password to be stored, the password is entered automatically from the stored password.

In conjunction with prompting the user for entry of the password, at step 103, a decision is made whether or not to invoke the secure password system. To implement this function, monitoring by the operating system or other software running in the background can be used to detect when an application contains a password prompt, and cause a pop-up to be displayed, for example, asking the user whether or not the secure password system is to be used in this instance. Preferably, the user is always prompted to make such decision when establishing a password for accessing a particular application for the first time. For example, this prompting occurs when the user establishes a password for accessing an investment account over the web for the first time. While the user may wish to utilize the secure password system for applications which handle sensitive private information, the user may also wish to forego using the secure password system in other cases, such as when the user is utilizing a computer other than his usual computer, perhaps as a guest on a computer at a public place. Alternatively, the user may decide not to use the secure password system for certain types of applications such as free subscriptions. As will be apparent from the description below, instances can arise where the user will prefer not to use the secure password system to be able to access an application using the password from different computers, i.e., when going from one computer to another during the day or while traveling.

In addition, when a secure password has already been established for a particular application as described below, this step 103 may result in a default decision to use the secure password system. However, in such case, a prompt may still be presented, advising the user that he can elect not to use the secure password system, e.g., in a case in which the user wishes to change from using a secure password to using one without the enhanced security. Alternatively, when a password has been established for a particular application for which the user is not very concerned about security, such as information available through a free subscription, the decision can be made by default that the secure password system will not be used, with the user being prompted to elect otherwise, if desired.

When a decision is made not to utilize the secure password system, processing continues at step 104, in which the user accesses an application by inputting the password and access is granted based on the inputted password. Typically, in such case, the password is inputted locally at one computer system and transmitted over a link between the one computer system and another computer system, e.g., server computer. In such case, there is a risk that the password could be captured by keystroke logging programs, through which an unauthorized user could use the captured password to access the user's account on the server computer. However, as discussed above, the user may be willing to tolerate such risk. After proceeding in the application without the enhanced password security, the application terminates, at step 105.

On the other hand, operation continues at step 106 when the decision is made instead to invoke the secure password system. In such case, the password is stored locally at the computer system to which it is input, and the secure password system is invoked (step 107).

Figure 2:
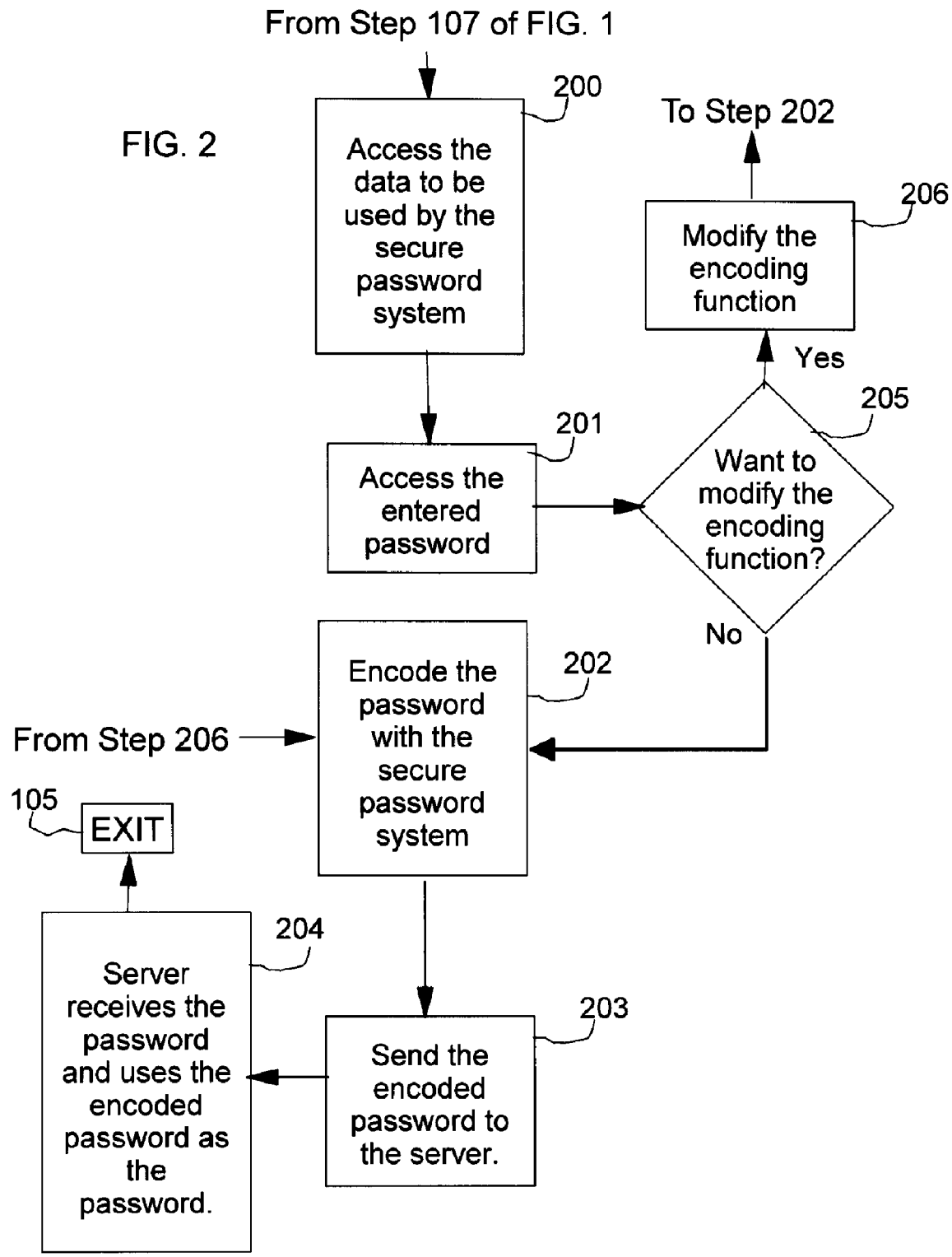

Next, continued operation will now be described with reference to FIG. 2. Operation next proceeds by accessing a set of data bits at the computer system that will be used to encode the password (step 200). Here, a unique set of secure data bits are accessed by the computer system to use for encoding the inputted password. For example, the inputted password can be multiplied and manipulated in accordance with an encryption key. Alternatively, no encoding data bits may need to be accessed at this step if the inputted password is to be passed through a hard-coded encoder, e.g., as a tapped linear feedback shift register, e.g., multiple input shift register in which the tap coefficients are hard-coded with a set of secure data unique to the computer system. In either case, the encoding algorithm can be considered a form of encryption. The inputted password is encoded using some combination of logical AND and logical OR operations with a group of encoding data bits that are held by the computer system, either as representing a permanent hardware state of an encoder, or otherwise stored permanently in some other non-volatile way.

Whether the encoding algorithm is implemented in hardware, software, or a combination of the two, consideration is preferably given to the following. First, the secure password system must encode the password in a consistent manner such that, barring any modifications to the encoding function, the encoding result on one computer system is the same from one time to another as long as the inputted password is the same each time. The encoding algorithm should also have an aspect which is unique to each user, such as by being unique to a computer system on which it is performed. In addition, the encoding algorithm should make it extremely difficult, if not impossible, to determine the encoding data bits or the encoding algorithm from knowledge of the password or the result of encoding the password using the encoding function.

Desirably, the encoding data bits are difficult to access on the computer system except to access in accordance with the embodiments of the invention. In addition, the encoding data bits are difficult, if not impossible to modify, and are unique to the computer system. For example, the encoding data bits may be stored in the form of the states of fuses in a bank of fuses. In one example, the fuses are blowable by localized heating, such as through a laser. In another example, the fuses are blowable by an electrical current, such fuses being referred to as "electrical fuses". Alternatively, or in addition thereto, the fuses may include electrical "antifuses", i.e., devices which are normally nonconductive, and become relatively conductive when a higher than normal voltage is placed across them.

Desirably, the encoding data bits include a key, a system specific identifier, or some other system specific data that is unique to the particular computer system. In a particular example, the system specific data can include a NetBios ("network basic input output system") name, or other unique information. The NetBios name is suitable for this purpose because it is unique to each computer system and is recognized by a function of the Windows® (registered trademark of Microsoft Inc.) operating system known as Windows Internet Name Service ("WINS"). The WINS function maps the NetBios name to an internet protocol ("IP") address used by the computer system. In another embodiment, a hardware element of the system, e.g., a Linear Feedback Shift Register (LFSR), can perform the encoding by applying coefficient information, preferably hard-coded, to the taps of a shift register to perform a convolutional encoding of the password. Alternatively, other system resident data can be used to perform the encoding, either using such data alone, or in combination with the NetBios name.

At step 201, the password that was inputted by the user and stored at step 106 (FIG. 1) is now accessed, e.g., retrieved from active system memory or local storage. Having accessed the password and accessed stored encoding data, if needed, the system is almost ready to begin encoding the password to form the secure password. Next, at step 205, a decision block is encountered. Here, a decision is made whether the encoding algorithm is to be modified prior to proceeding to encode the password. If the decision is "No" then, at step 202, the system proceeds to encode the password in accordance with the accessed encoding data or by processing the password through a hard-coded encoder such as a tapped multiple input shift register, as described above.

Then, at step 203, the encoded password is transmitted to the server. As indicated at step 204, the server receives only the encoded password rather than the originally inputted password. The server then stores the encoded password as the password for accessing the particular application. Thus, as far as the purposes of the server are concerned, the encoded password is the password required to access the application, i.e., the password that the server expects to receive each time access to the application is requested.

Moreover, the password used to access a server application from a user computer is secured against illicit logging of keyboard or other input on the user computer. Since the server computer receives and uses only the encoded password from the user computer, a password that is illicitly copied by logging input from the user computer keyboard will fail to obtain access. In addition, particularly when the encoding algorithm is performed to encrypt the inputted password, illicit attempts to thwart the security of the encoded password will fail due to difficulty in calculating the value of the encoded password or determining the encoding algorithm merely from knowledge of the password as originally input by the user.

Further, as mentioned above, a decision is made at step 205 concerning whether the encoding algorithm is to be modified. Here, if the decision to modify the encoding algorithm is "Yes", processing next proceeds by entering the modifications to the computer system. Here, security may be enhanced additionally by modifying some portion of the encoding data bits used to encode the password. For example, such modification can be made by altering the blown/unblown states of a bank of fuses, especially electrical fuses and/or antifuses. In another example, the states of a set of hardware switches can be reversibly modified, e.g., through physically setting the switches which can be provided on a card or board of the system, such as switches commonly known as dual-inline-package (DIP) switches. Alternatively, the encoding algorithm can be modified by altering the starting point in a software algorithm used to encode the password.

Note that the computer system may include a configurable feature which invokes a permanent modification of the encoding algorithm. Such permanent modification can provided protection if a system identifier such as a NetBios name, for example, becomes known. Alternatively, a choice of whether to modify or leave the encoding algorithm unchanged is given to the user. In this case, whether the encoding algorithm is modified in the hardware or in software, the user can be presented a list of choices for modifying the algorithm through a screen, i.e., through a menu or a graphical user interface ("GUI").

After the encoding algorithm has been modified, operation continues with the encoding of the password at step 202, after which the encoded password is transmitted to the server at step 203 and used by the server 204, as described in the foregoing.

Note that a password is only one specific type of information that can be encoded and used to access secure information according to an embodiment of the invention. In another example, other data can be encoded that is provided to an application for recovering a password, such data including private by easily remembered information such as the name of a pet, a birthday, a favorite movie, etc. In each case, the user inputs the information and the secure password system encodes the information and transmits the same to another computer system which stores the encoded information as the information used for the password recovery function. Undoubtedly, the secure password system can be put to use in securing many types of inputted information to protect against unauthorized access to secure information.

Figure 3:
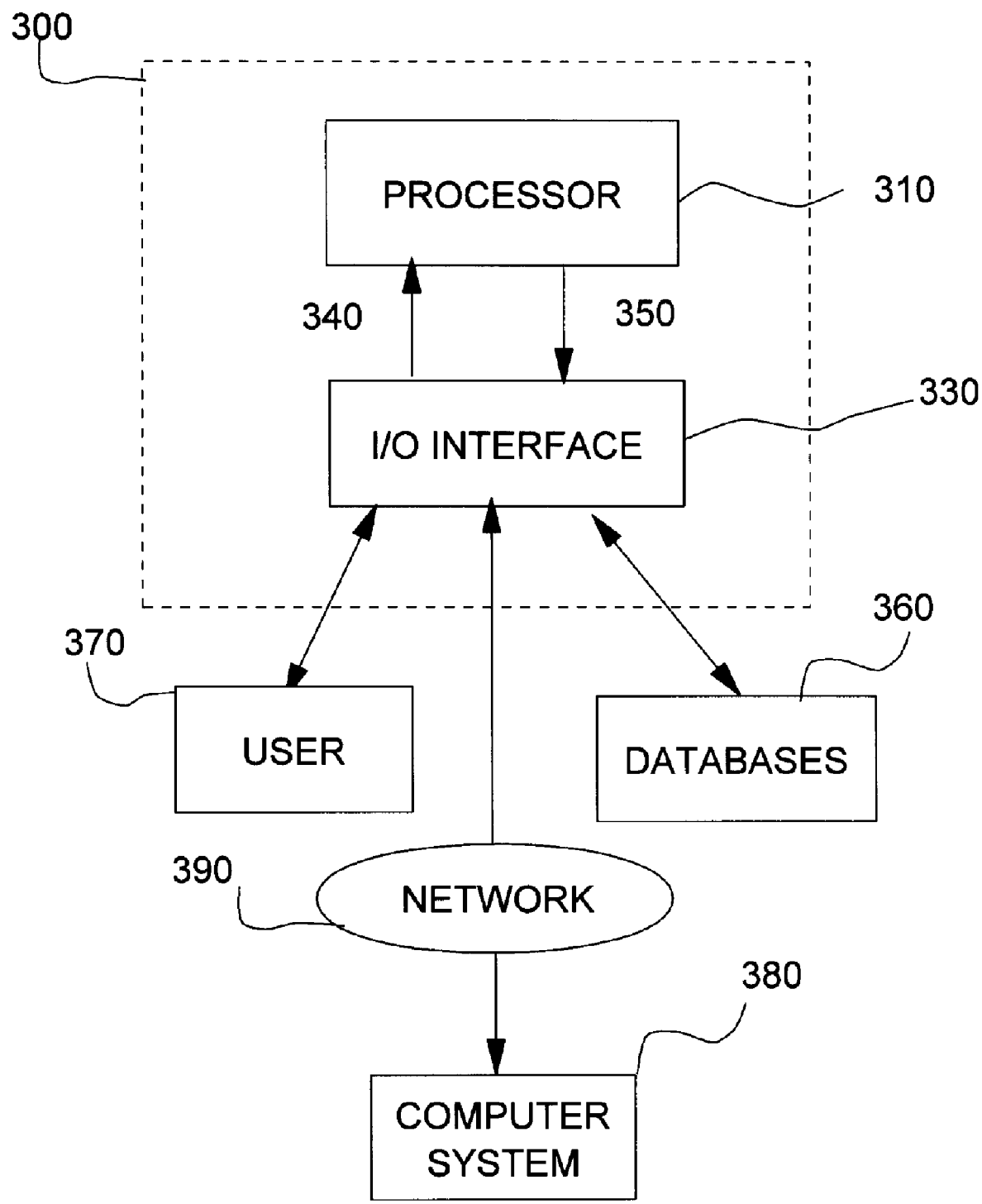
FIG. 3 is a block diagram illustrating a secure computer password system according to an embodiment of the invention.

FIG. 3 illustrates an enhanced security computer system 300 including a first computer for accessing information from a second computer using a password according to an embodiment of the invention. As shown in FIG. 3, the computer system includes a first computer or central processing unit (CPU) 310 provided with a memory 310. The CPU 310 may include a single processor or a plurality of processors arranged to execute instructions of a program in a parallel or semi-parallel manner. An input output (I/O) and network interface 330 (hereinafter "I/O interface") is provided for inputting a program including instructions and data for performing a method, such as that described above with reference to FIGS. 1 and 2, to the CPU 310 and for outputting the results of executing a program. The I/O interface 330 preferably includes one or more types of interfaces to removable digital storage media such as a magnetic disk, magneto-optic disk, read/write and/or read only optical disc, digital tape, removable disk drive and/or removable solid state memory such as a portable memory card. In addition, the I/O interface includes a network interface such as a modem or network adapter card for permitting transfer of information to and from a network. The I/O interface 330 may also include a display for outputting information to and/or inputting information from a user 370. The I/O interface 330 may additionally include one or more user interface devices such as a keyboard, mouse, speaker, joystick, scanner, printer, etc. and the like. To the extent that any of the above described types of removable storage media are present in the I/O interface, a program containing a set of instructions that is stored in such removable storage medium can be transferred as input 340 between the I/O interface 330 and the CPU 310. In addition to the program, a set of data, e.g., mask data and other data, to be operated upon by the instructions is also input over the I/O interface 330, e.g. from databases 360 or one or more second computers, e.g., server computers 380 through a network 390.

Once the program and the data set to be operated upon have been loaded into the CPU 310, the CPU then executes the set of instructions of the program relative to the data and provides output 350 to the I/O interface 330 connected thereto.

In one embodiment, a program containing information, e.g., instructions for performing a method according to an embodiment of the invention is stored on one or more removable storage media to be provided to the I/O interface 330 and loaded into the CPU 310. Alternatively, the program containing the instructions is transferred from a storage medium such as a memory of one or more computers or other storage devices of a network to a modem, network adapter or other device of the I/O interface 330 and further transferred therefrom to the CPU 310. After the CPU 310 receives and loads the program into memory, the program is then executed relative to the set of data provided to the CPU 310. In such way, an enhanced security method can be performed for accessing information from a second computer using a password in accordance with an embodiment of the invention.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. An enhanced security method for accessing information from a second computer using a password at a first computer, comprising:
   a) in a network including a plurality of first computers operating as client computers and a plurality of second computers operating as server computers serving respective applications, user inputting a password to one of the first computers for requesting access to a particular one of the applications, the password being establishable for accessing the particular requested application and being establishable when accessing the particular requested application for the first time;
   b) encoding the password using an encoding algorithm specific to the one first computer;
   c) transmitting the encoded password to the second computer; and
   d) receiving and using the encoded password at the second computer serving the requested application to grant or deny access to the one first computer to the requested application, without the second computer decoding the encoded password to obtain the password inputted to the one first computer.

2. The method as claimed in claim 1, wherein the password is encoded by hardware on the first computer.

3. The method as claimed in claim 2, wherein the password is encoded by a tapped linear feedback shift register having hard-coded coefficients.

4. The method as claimed in claim 3, wherein the tapped linear feedback shift register includes a multiple input shift register.

5. The method as claimed in claim 1, wherein the password is encoded using a set of data bits specific to the first computer.

6. The method as claimed in claim 5, wherein the specific data bits include a unique identifier associated with the first computer.

7. The method as claimed in claim 6, wherein the unique identifier includes a NetBios name.

8. The method as claimed in claim 1, wherein the password is encoded via software encryption.

9. An enhanced security method for accessing information from a second computer using a password at a first computer, comprising:
   a) in a network including a plurality of first computers operating as client computers and a plurality of second computers operating as server computers serving respective applications, user inputting a password to one of the first computers for requesting access to a particular one of the applications, the password being establishable for accessing the particular requested application and being establishable when accessing the particular requested application for the first time;
   b) encoding the password using an encoding algorithm specific to the one first computer;
   c) transmitting the encoded password to the second computer;
   d) receiving and using the encoded password at the second computer serving the requested application to grant or deny access to the one first computer to the requested application, without the second computer decoding the encoded password to obtain the password inputted to the one first computer; and
   e) modifying the encoding algorithm under user control at the first computer.

10. The method as claimed in claim 9, wherein the modifying step includes altering a hardware state of the first computer.

11. A machine-readable recording medium having information recorded thereon for performing an enhanced security method for accessing information from a second computer using a password at a first computer, the method comprising:
   a) in a network including a plurality of first computers operating as client computers and a plurality of second computers operating as server computers serving respective applications, user inputting a password to one of the first computers for requesting access to a particular one of the applications, the password being establishable for accessing the particular requested application and being establishable when accessing the particular requested application for the first time;
   b) encoding the password using an encoding algorithm specific to the one first computer;
   c) transmitting the encoded password to the second computer; and
   d) receiving and using the encoded password at the second computer serving the requested application to grant or deny access to the one first computer to the requested application, without the second computer decoding the encoded password to obtain the password inputted to the one first computer.

12. The recording medium as claimed in claim 11, wherein the password is encoded by hardware on the first computer.

13. The recording medium as claimed in claim 11, wherein the encoding algorithm is performed using data bits specific to the first computer including a unique identifier associated with the first computer.

14. The recording as claimed in claim 13, wherein the unique identifier includes a NetBios name.

15. The recording medium as claimed in claim 11, wherein the password is encoded via software encryption.

16. The recording medium as claimed in claim 11, wherein the method further comprises modifying the encoding algorithm under user control at the first computer.

17. The method as claimed in claim 1, further comprising (e) user selecting whether to invoke secure password handling;

(f) performing the steps (b), (c) and (d) when the secure password handling is invoked; and (g) when the secure password handling is not invoked, performing the steps of (i) transmitting the inputted password without encoding the password with the specific encoding algorithm and (ii) receiving and using the password not encoded with the specific encoding algorithm at the second computer to grant or deny access to the one first computer to the requested application.

18. The recording medium as claimed in claim 11, wherein the method further comprises (e) user selecting whether to invoke secure password handling;

(f) performing the steps (b), (c) and (d) when the secure password handling is invoked; and (g) when the secure password handling is not invoked, performing the steps of (i) transmitting the inputted password without encoding the password with the specific encoding algorithm and (ii) receiving and using the password not encoded with the specific encoding algorithm at the second computer to grant or deny access to the one first computer to the requested application.

\* \* \* \* \*

UNITED STATES PATENT AND TRADEMARK OFFICE
CERTIFICATE OF CORRECTION

PATENT NO. : 7,669,057 B2 Page 1 of 1
APPLICATION NO. : 10/905854
DATED : February 23, 2010
INVENTOR(S) : Kelley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Twenty-eighth Day of December, 2010

David J. Kappos
*Director of the United States Patent and Trademark Office*